May 28, 1968 J. R. ROOT ET AL 3,385,058
HYDRAULIC DRIVE AXLE
Filed Sept. 7, 1965 2 Sheets-Sheet 1
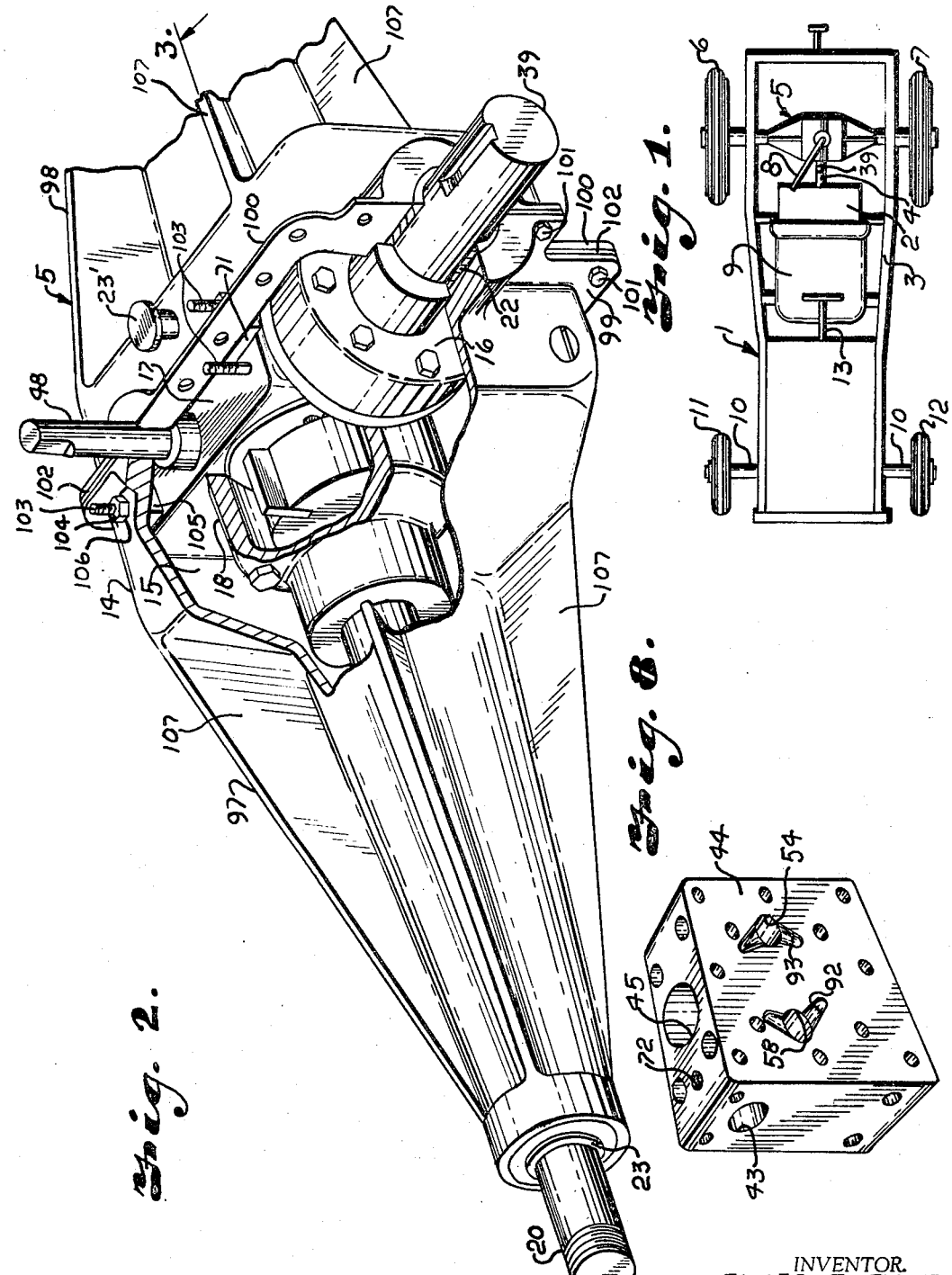
INVENTOR.
JAMES R. ROOT
JOHN R. WESTELL
BY
Fishburn and Gold
ATTORNEYS May 28, 1968  J. R. ROOT ET AL  3,385,058
HYDRAULIC DRIVE AXLE
Filed Sept. 7, 1965  2 Sheets-Sheet 2

INVENTOR.
JAMES R. ROOT
JOHN R. WESTELL
BY
Fishburn and Gold
ATTORNEYS

United States Patent Office 3,385,058
Patented May 28, 1968

3,385,058
HYDRAULIC DRIVE AXLE
James R. Root, 3412 Norton, Independence, Mo. 64052, and John R. Westell, 5430 W. 100th Terrace, Overland Park, Kans. 66207
Filed Sept. 7, 1965, Ser. No. 485,405
5 Claims. (Cl. 60—53)

This invention relates to a hydraulic transmission for a motor drive vehicle and more particularly, to a hydraulic drive axle assembly.

The principal objects of this invention are: to provide a self-contained drive axle assembly mounted on the frame of a vehicle to support the wheels and operatively connected to an engine to drive said wheels comprising a housing which may act as a frame member and which defines a hydraulic fluid reservoir and having a valve housing, pump and motors assembled into a unitary structure within said reservoir; to provide a hydraulic drive axle assembly having a housing defining a fluid reservoir, a unitary structure mounted in said reservoir comprised of a hydraulic pump operatively connected to an engine drive shaft and having an inlet port communicating with the reservoir and an outlet port communicating with a passageway in a control valve housing which is attached directly to the pump, said passageway in the valve housing communicating with an inlet port on two hydraulic motors which are attached directly to the valve housing, through a control valve mechanism which may alter the direction of flow of the fluid, said hydraulic motors also having an outlet port which communicates with the control valve mechanism through a second passageway in the valve housing such that the control valve mechanism may cause the flow of hydraulic fluid to the motors through either the inlet or outlet ports on said motor to reverse the rotational motion of said motors and said valve housing also having a third passageway extending between the reservoir and valve control mechanism to provide a bypass system wherein the pump may discharge the fluid back into the reservoir by-passing the hydraulic motors, said hydraulic motors being operatively connected to output shafts which extend out from the housing to the traction wheels; to provide a hydraulic drive axle assembly in a complete package unit which does not require an external clutch; to provide a hydraulic drive axle assembly having an outer housing which serves as a heat exchanger, liquid or fluid reserve reservoir and as an axle frame; to provide a hydraulic drive axle assembly having a unitary structure comprised of pumps, motors, and control valve housing enclosed within the reservoir and submerged in the hydraulic fluid, thus preventing hot spots or lack of lubrication and providing an arrangement wherein minor leakage is not critical.

Other principal objects of this invention are: to provide a hydraulic drive axle assembly for use on a vehicle utilizing a control valve to control the direction of flow of the hydraulic fluid wherein the fluid flow direction may be reversed to provide a reverse direction of movement of the vehicle itself; to provide a hydraulic drive axle wherein the flow of fluid may be reversed and the direction of movement of the vehicle reversed without bringing the vehicle to a complete stop; to provide a hydraulic drive axle wherein the reverse setting utilizes the same ratio between the driver and the driven and the same variable control as utilized in the forward setting; to provide a hydraulic drive axle assembly wherein the differential between the driven motors allows a smooth flow of power between the wheels when a turn is made; to provide a hydraulic drive axle assembly having a unitary assembly of motors, pump, fluid reservoir and valve housing utilizing no hoses or other plumbing connections wherein costly leaks may develop; to provide a hydraulic drive axle assembly which is relatively simple in construction and inexpensive to manufacture and may be utilized on small inexpensive vehicles such as lawn tractors.

Other objects and advantages of this invention will become apparent from the following description taken in connection with the accompanying drawings wherein are set forth by way of illustration and example certain embodiments of this invention.

FIG. 1 is a top view of a vehicle utilizing the hydraulic drive axle assembly described herein.

FIG. 2 is a perspective view of the hydraulic drive axle assembly with the housing of said axle broken away to show the pump, control valve and one of the hydraulic motors contained therein, with the casing of the motor also broken away to illustrate the rotor and moveable vanes of the hydraulic motor.

FIG. 8 is a perspective view of the control valve block.

Figure 3:
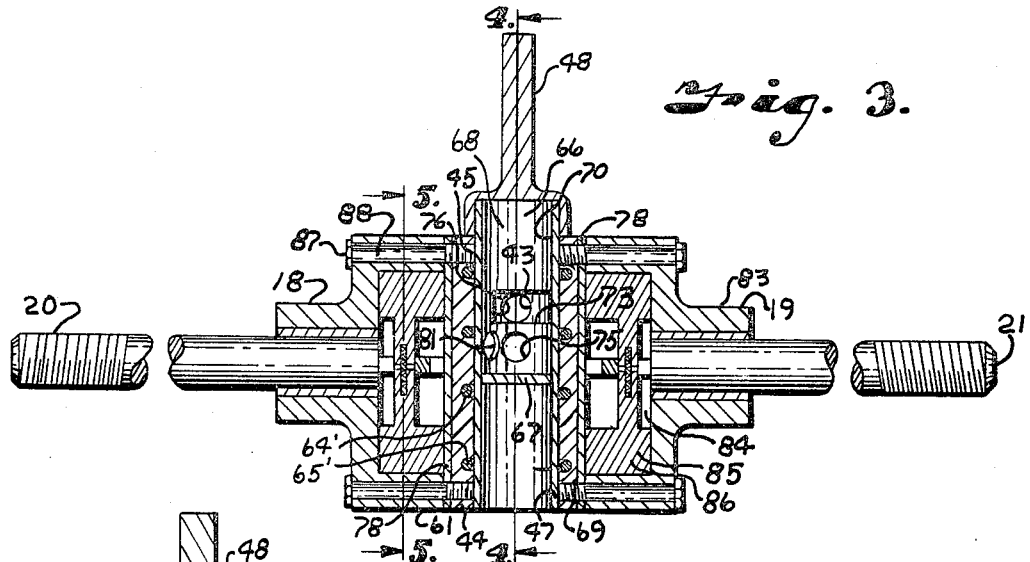
FIG. 3 is a cross-sectional view taken along line 3—3 of FIG. 2 showing the two hydraulic motors disposed on opposite sides of the control valve.

This invention is contemplated for utilization in lightweight, low priced mobile units such as small lawn tractors and has a self-contained axle assembly and a hydraulic drive to serve as a power transmission from the engine to the traction wheels. The invention further contemplates a structure having a control valve housing with a pump and motors directly attached thereto with the entire assembly contained in an axle housing which defines a hydraulic fluid reservoir and having output shafts operatively connected to the motors and extending out from the axle housing and connected to the traction wheels of a vehicle.

Referring to the drawings in more detail:

The reference numeral 1 refers generally to a vehicle such as a lawn tractor or the like embodying the features of this invention. A variable speed prime mover 2 such as an internal combustion engine is mounted on frame 3 and connected by a drive shaft 4 to a hydraulic drive axle assembly 5. The hydraulic drive axle assembly 5 is illustrated in a rear drive vehicle 1 and serves to transmit energy from the drive shaft 4 to the rear wheels 6 and 7. This hydraulic drive axle 5 could equally well be used in a front wheel drive or four-wheel drive vehicle.

A control lever 8 extends upwardly and outwardly from the hydraulic drive axle assembly 5 toward seat 9 from which an operator may control the flow of hydraulic fluid through the hydraulic drive axle assembly 5 to stop, start or reverse the direction of said vehicle 1 by simply rotating the control lever 8. The illustrated vehicle 1 has a conventional axle 10 connected to frame 3 with wheels 11 and 12 rotatably mounted thereon with a conventional steering mechanism shown as 13.

Referring to FIG. 2, the hydraulic drive axle assembly 5, as illustrated, has an axle frame or exterior housing 14 which serves as a rear frame member and defines a reservoir 15 and houses a hydraulic pump 16, a control valve 17, two hydraulic motors 18 and 19 disposed on opposite sides of the control valve 17 and output or driven shafts 20 and 21 operatively connected to motors 18 and 19. The hydraulic fluid utilized to drive motors 18 and 19 is contained in reservoir 15, thus providing a closed system and allowing all elements of the hydraulic drive axle assembly 5 to operate in a partially submerged condition in reservoir 15. The reservoir 15 is sealed at the input shaft 39 by seal 22 and at each of the output shafts 20 and 21 by seals 23 to prevent leakage of the hydraulic fluid from the reservoir 15. The reservoir 15 has an opening to the atmosphere through a vented fill cap 23', therefore, low pressure seals may be utilized.

The housing 14 is comprised of two sections 97 and 98 with flanges 99 and 100, respectively, secured together by bolts 101 as shown in FIG. 2. The pump 16, control valve 17, motors 18 and 19, and output shafts 20 and 21 are first assembled in a unitary structure. The housing sections 97 and 98 may then be inserted over the output shafts 20 and 21 respectively and said sections are then joined together at flanges 99 and 100. A gasket 102 is secured between flanges 99 and 100 to prevent leakage from the fluid reservoir 15.

The assembly of the pump 16, control valve 17, motors 18 and 19 and output shafts 20 and 21 is mounted in the fluid reservoir 15 by means of studs 103, nuts 104 and lugs 105, said studs 103 being secured in threaded engagement or by other suitable means with the control valve 17 and extend through openings 106 in housing 14 to receive nuts 104 to pull the control valve into abutting contact with lugs 105 on housing 14. The housing 14 has a plurality of ribs 107 to increase the strength of the housing to facilitate its utilization as an axle frame and also to increase the surface area of the housing from which heat will be dissipated to improve the efficiency of the housing 14 as a heat exchanger.

Figure 4:
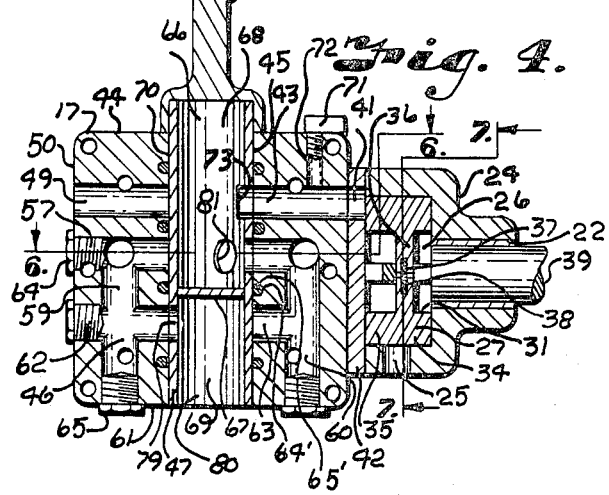
FIG. 4 is a cross-sectional view taken along line 4—4 of FIG. 3 showing the control valve with the hydraulic pump assembly attached thereto.

Referring to FIG. 4, the pump mechanism 16 is comprised of a body portion or pump casing 24 with an intake port 25 through which the hydraulic fluid in reservoir 15 is drawn into the inner chamber 26 of the hydraulic pump 16 with a reaction member 27 mounted in said chamber 26.

Figure 7:
FIG. 7 is a cross-sectional view taken along line 7—7 of FIG. 4 showing the hydraulic pump assembly.

The pump reaction member 27, illustrated in FIG. 7 as a rotor and vane assembly 28, is comprised of a rotor 29 having slots 30 and 31 intersecting one another at right angles and sliding vanes 32. It should be noted that hydraulic pumps utilizing other types of reaction members may be substituted for the pump mechanism 16 of this disclosed combination. The vanes 32 are comprised of two sections 33 and 34, each section 33 and 34 having a head portion 35 and a stem portion 36. The stem portion 36 of each section 33 and 34 contains a bore 37 for receipt of a spring element 38. Each of the sections 33 and 34 has a length less than the radius of the internal chamber 26 of pump 16. When the head portion 35 of each of sections 33 and 34 is in contact with the valve or pump casing 24, the stem portions 36 of each of said sections 33 and 34 are slightly spaced from one another. These variable length vanes 32 are essential as the entire rotor and vane assembly 28, as shown in FIG. 7, is laterally offset from the center point of the inner chamber 26, thus the distance varies between the points of contact between the head portions 35 of sections 33 and 34 and the pump casing 24. The variable length vanes 32 are therefore necessary in order to maintain a sealing contact between the head portion 35 of each of the vane sections 33 and 34 and the pump casing 24 and at the same time, prevent excessive wear on either the vanes 32 or the pump casing 24. The vanes may be constructed from any suitable metallic material, from a linen filled phenolic resin or other suitable material.

The rotor 27 is connected to the power plant 2 by means of an input shaft 39 which is suitably connected to the drive shaft 4, thus transmitting a rotational driving force to the rotor and vane assembly 28. A centrifugal force created by the rotational driving force supplied to the rotor and vane assembly 28 from power plant 2 causes the vanes 32 to move outwardly in the chamber 26 providing a seal at the point of contact between the pump casing 24 and the vanes 32.

Chambers 40 are defined by the pump casing 24, the rotor 29 and adjacent vanes 32. These chambers 40, here illustrated as 4 in number, vary in volume due to the eccentric mounting of the rotor 29 within the casing 24. As the vanes 32 pass the intake port 25, the volume of the chamber 40 associated with that particular vane 32 directly above or adjacent intake port 25 begins to expand, thus drawing the hydraulic fluid into said chamber 40. The fluid is then carried within the chamber 40 to the outlet port 41. At the outlet port 41, the chamber 40 is being reduced in volume due to the proximity of the rotor 29 to the pump casing 24 and thereby forces the fluid out of the chamber 40 and through the outlet port 41.

The outlet port 41 extends through a plate 42 which is disposed between the pump casing 24 and the control valve 17. Plate 42 thus provides a back side for chamber 26 of the pump casing 24 and may serve as a gasket to prevent leakage and loss of pressure at the connection of the pump casing 24 to the control valve 17. The outlet port 41 communicates with the intake passage 43 of the control valve 17.

The control valve 17 is comprised of a block 44, best shown in FIG. 8, having a vertically disposed through bore 45 and a series of passageways of conduits 46 to allow the passage of hydraulic fluid through the control valve 17 and a valve stem 47 with a control handle 48 to which the control lever 8 may be attached.

The series of passageways 46 in control block 44 provide communication between the pump 16 through bore 45 to hydraulic motors 18 and 19 and the reservoir 15. An intake passage 43 extends through block 44 to the through bore 45 from which any number of passageways may extend depending upon need of hydraulic fluid in various locations. In the preferred embodiment, here illustrated, five passageways extend outwardly from the through bore 45. By-pass passageway 49, as illustrated, is located directly opposite the intake passage 43 across the through bore 45 and extends through the outer edge 50 of block 44 to provide direct communication between the through bore 45 and the fluid reservoir 15.

The delivery passageway 51 to motors 18 and 19 and the return passageway 52 from motors 18 and 19 are illustrated as extending outwardly from the through bore 45 in opposite directions from a position offset below the intake passageway 43 and the by-pass passageway 49. The delivery passageway 51 is shown as being generally T-shaped having a stem portion 53 in communication with the through bore 45 and a cross portion 54 communicating with the stem portion 53 and extending completely through block 44 and through side edges 55 and 56 of the block 44. The return passageway 52 is illustrated as being in the form of a cross having one leg portion 57 of the cross in communication with the reservoir 15 through side edge 50 and the through bore 45 and directly opposite the stem portion 53 of the delivery passageway 51. Said return passageway 52 also has a second leg portion 58 which extends outwardly from communication with the first cross leg portion 57 and through side edges 55 and 56 of the block 44.

The return passageway 52 and the delivery passageway 51 each have a connecting passageway 59 and 60 respectively, extending from said passageways 51 and 52 at right angles thereto, as illustrated, and in communication therewith. Both passageways 59 and 60 extend outwardly from the return passageway 52 and the delivery passageway 51 respectively and through the bottom side 61 of the control block 44. The passageway 59 has a cross passageway 62 which intersects said passageway 59 at a right angle thereto and at one end extends into the through bore 45 and at the opposite end extends through the outer side edge 50 providing communication between the reservoir 15 and the through bore 45. Passageway 60 has a lateral passageway 63 extending at a right angle thereto and into the through bore 45. The passageways 57 and 62 which extend through the side edge 50 of the block 44 have plugs 64 therein to prevent a flow of fluid into the reservoir 15. Passageways 59 and 60 have similar plugs 65 sealing their entry into reservoir 15. Plugs 64 and 65 may be removed to drain the block 44 and flush the passageways in said block. Block 44 is also provided with a plurality of circumferential grooves 64', here shown as four in number, disposed along through bore 45 between various passageways with an O-ring seal 65' disposed in each groove and in abutting relation to the valve stem 47 to prevent the leakage of fluid between the through bore 45 and the side wall 70 of the valve stem 47 from adjacent passageways.

A valve stem 47 is mounted by conventional means in the through bore 45 of the block 44. The valve stem 47, as illustrated, has a cylindrical shape having a hollow interior 66 with a partition 67 dividing the hollow interior 66 into an upper chamber 68 and a lower chamber 69. The partition 67, as illustrated, is located between the entry openings of the delivery and return passageways 51 and 52 into through bore 45 and the entry openings of passageways 62 and 63 into through bore 45.

The side wall 70 of the valve stem 47 contains a series of openings which upon proper orientation of the valve stem 47 will align with the various passageways which enter the through bore 45 to obtain the various directions of flow of hydraulic fluid desired.

The pressure system previously described contains a pressure relief valve 71 which, as shown in FIG. 4, is connected to relief port 72 in block 44 providing communication between the intake passageway 43 and reservoir 15 when relief valve 71 is open. The port 72 or another similar port may be utilized as a power take-off to obtain fluid pressure for auxiliary uses.

The fluid is pumped from the reservoir 15 through the pump 16, out the outlet port 41 in plate 42 and into the intake passageway 43 in the control valve 17. From the intake passageway 43, the fluid passes to the through bore 45 and into the upper chamber 68 of valve stem 47 through slot 73 in the side wall 70 of said valve stem 47. By means of a series of properly oriented openings in the side wall 70 of the upper chamber 68 of valve stem 47, the hydraulic fluid may be passed into any number of passageways as desired.

An opening 74 not shown on the drawings is designed to communicate with the by-pass passageway 49 when the valve stem 47 is oriented to a designated position which may be indicated on a plate associated with the control lever 8 or by other means. This provides a through passage of the hydraulic fluid from the pump through the block 44 and directly into the reservoir 15, thus by-passing the motors 18 and 19 and thereby placing the vehicle 1 in a neutral or no-power condition.

Figure 6:
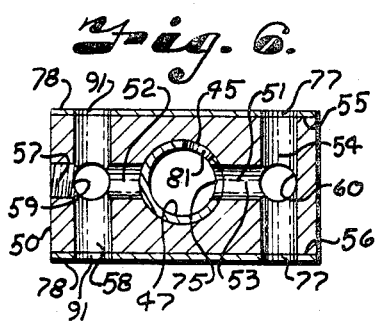
FIG. 6 is a cross-sectional view taken along line 6—6 of FIG. 4 showing the control valve housing, the valve stem and the passageways for flow of the hydraulic fluid.

A third opening 75 in side wall 70 located directly below a side edge 76 of slot 73 provides communication between the upper chamber 68 of the valve stem 47 and the motors 18 and 19, when said opening 75 is aligned with delivery passageway 51, as shown in FIG. 6. The fluid passes through the stem portion 53 which directly communicates with the interior upper chamber 68 of the valve stem 47 when opening 75 is aligned therewith and into the cross passageway portion 54 which extends from the stem portion 53 outwardly towards each side edge 55 and 56 of the control valve block 44 to inlet port 77 in plates 78 to allow the passage of fluid from the upper chamber 68 to the motors 18 and 19.

As shown in FIGS. 4 and 6, a vertical passageway 59 intersects the delivery passageway 51 and extends downwardly in the control block 44. The passageway 60 is completely sealed off when the valve stem 47 is so oriented to place opening 75 in communication with the stem portion 53 of the delivery passageway 51 by side wall 70 of valve stem 47 at the through bore 45 and by plug 65; thus the vertical passageway 60 will not affect the flow of hydraulic fluid from the upper chamber 68 to motors 18 and 19.

The return passageway 52 from motors 18 and 19, as illustrated, is oppositely disposed in the valve control block 44 from the delivery passageway 51. When the vehicle 1 is in the forward setting, as shown in FIG. 4, the cross leg passageway 57 of the return passageway 52 is closed at the through bore 45 by the side wall 70 of the valve stem 47 to prevent the flow of hydraulic fluid from the motors 18 and 19 back into the upper chamber 68 of valve stem 47. The hydraulic fluid from the motors flows through the cross leg portion 58 of the return passageway 52 and into the vertical passageway 59 which communicates with the return passageway 52 at the point of intersection between crossleg passageways 57 and 58 of return passageway 52. The fluid returning from the motors 18 and 19 then passes through the vertical passageway 59 to an intersecting cross horizontal passageway 62 and then into the lower chamber 69 in the valve stem 47 through opening 79 in the side wall 70 of the valve stem 47 and finally outward through the lower opening 80 in the lower chamber 69 of valve stem 47 and into reservoir 15. Opening 79 must be so oriented in the lower chamber 69 of valve stem 47 that it aligns with the horizontal passageway 62 when the opening 75 in the upper chamber 68 of valve stem 47 is aligned with the delivery passageway 51.

To move the vehicle 1 in a reverse direction, the control lever 8 is turned by the operator to a position which may be indicated on a marking plate associated with lever 8 wherein the opening 81 in the upper chamber 68 of the valve stem 47 communicates with the return passageway 52, thus reversing the flow of hydraulic fluid in the system resulting in a reversal of the direction of operation of the motors 18 and 19, causing the output shafts 20 and 21 to revolve in the opposite direction.

When the valve stem 47 is so oriented to place opening 81 in communication with the return passageway 52, the side wall 70 seals off the delivery passageway 51 and the horizontal cross passageway 62 which communicates with the lower chamber 69 of the valve stem 47 and moves opening 82, not shown, in the lower chamber 69 into alignment with the lateral passageway 63, thereby making the delivery passageway 51 a return passageway for the hydraulic fluid from motors 18 and 19 through the cross portion 54 to the vertical passageway 60 intersecting said delivery passageway 51 and downward into the lateral passageway 63 and thence into the lower chamber 69 through opening 82, not shown, in the side wall 70 of the valve stem 47. By rotation of the valve stem 47 to various positions, the openings in side wall 70 of valve stem 47 are brought into alignment with certain members of the passageway system 46 to move the vehicle 1 in a forward or reverse direction or to place the vehicle in a no-power neutral condition by varying the direction of flow of the hydraulic fluid through the passageway system in the control block 44.

Figure 5:
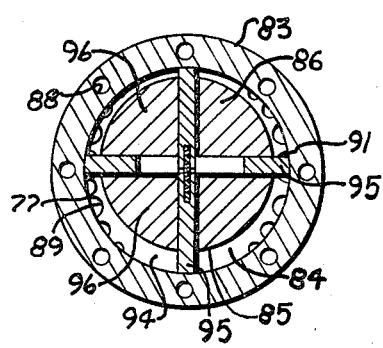
FIG. 5 is a cross-sectional view taken along line 5—5 of FIG. 3 showing the rotor and vane assembly of the hydraulic motor.

The hydraulic motors 18 and 19, as illustrated, are identical in construction and comprised of a motor housing 83 having an internal chamber 84 with a reaction member 85. The reaction member 85 is shown herein as a rotor and vane assembly 86 eccentrically mounted within the internal chamber 84 as shown in FIG. 5. The construction of the rotor and vane assembly 86, as illustrated, is identical to the rotor and vane assembly 28 in pump 16 and operates in a similar manner.

The motor housings 83 for motors 18 and 19 are secured to the control block 44 by conventional means, here illustrated as bolts 87, received in threaded openings 88 in the control valve block 44 with the plates 78 disposed between the sides 55 and 56 of the control block 44 and the motor housings 83.

Each of the plates 78 has a series of holes 89 and 90, best shown in FIG. 5, disposed adjacent the inlet port 77 and a discharge port 91 respectively providing communication between the internal chamber 84 of the motor housing 85 and grooves 92 and 93 respectively, shown in FIG. 8, in the control valve block 44. The grooves 92 and 93 communicate with delivery passageway 51 and return passageway 52 in the control valve block 44. The cooperating holes 89 and 90 and grooves 92 and 93 facilitate the flow of hydraulic fluid between the passageways 51 and 52 of the control valve block 44 and the motors 18 and 19 by spreading the fluid intake area in the case of the inlet port 77 over a wider area, thus allowing a greater intake of fluid into each chamber 94 between adjacent vanes 95, rotor 96 and the motor housing 83; and in the case of the discharge port 91, a spreading of the area of outflow of the hydraulic fluid from chambers 94 in motors 18 and 19 to the return passageway 52.

The hydraulic fluid is injected into chambers 94 in the motors 18 and 19 through inlet port 77 and openings 89 in plate 78 increasing the pressure within the chamber 94 causing the rotor 96 to rotate to increase the volume of the chamber 94 to relieve the pressure buildup caused by the injection of hydraulic fluid, said rotation being in a clockwise direction in the illustrated embodiment in FIG. 5. As the rotor and vane assembly 86 continues to rotate in a clockwise direction, the volume of the chamber 94 is reduced, thus forcing the hydraulic fluid outward through the discharge port 91 into the return passageway 52 to the lower chamber 69 of the valve stem 47 and into the reservoir 15.

The rotor 96 of motors 18 and 19 are operatively connected to the output shafts 20 and 21 and thereby transfer the clockwise rotation of the rotor and vane assembly 86 to the output shafts 20 and 21 to drive the traction wheels 6 and 7 and move the vehicle 1 in a forward direction.

If the flow of hydraulic fluid is reversed in the control valve 17 and injected into chamber 94 of the motors 18 and 19 through the discharge port 91, the rotor and vane assembly 86 will be driven in a counterclockwise direction thereby resulting in a rearward movement of vehicle 1.

The speed at which the vehicle 1 operates may be varied by varying the speed of the prime mover 2 or by movement of the valve stem 47 to locate the openings in side wall 70 in varying degrees of open to increase or decrease the quantity of flow of hydraulic fluid through the various passageways. A built-in speed ratio may also be utilized by employing pumps and motors of different capacity to provide a desired speed reduction or increase as a one-to-one ratio between the pumps and motors is not necessary.

When the valve stem 47 is rotated from its by-pass or neutral setting to a forward or reverse setting, the rotation may be made slowly to provide a gradual opening of the passageways and therefore, a gradual increase in the quantity of flow of hydraulic fluid in the passageways to provide a clutching action. The clutching action is extremely important when the vehicle 1 is pulling large loads.

When the prime mover 2 is turned off, the valve stem 47 is rotated to a designated position which closes the openings 75, 79, 81 and 82 in the side wall 70 of the valve stem 47, thus providing a hydraulic brake. With the passageways to and from the motors 18 and 19 so sealed, the output shafts cannot be rotated as the hydraulic fluid remaining in chambers 84 of motors 18 and 19 cannot be forced out the discharge port 91 or the inlet port 77, as the system is closed at the valve stem 47.

It is to be understood that while we have illustrated and described one form of our invention, it is not to be limited to the specific form or arrangement of parts herein described and shown except insofar as such limitations are included in the claims.

What we claim and desire to secure by Letters Patent is:

1. A hydraulic drive axle assembly comprising:

(a) a housing having a hollow interior providing a fluid reservoir,
(b) a hydraulic pump mounted in said fluid reservoir and having a body portion and a reaction member, with a port in said body portion providing communication between the reservoir and the reaction member of said hydraulic pump, and a second port in said body portion for discharge of the fluid,
(c) means connected to the hydraulic pump for driving the reaction member,
(d) a valve control block in said reservoir connected to the hydraulic pump having flow passages therein in communication with the discharge port in the body portion of the hydraulic pump, and having outlet ports, said valve block having a through bore,
(e) a valve stem disposed in said through bore of the valve block and having a plurality of openings therein which, upon selective settings of the valve stem, communicate with the various flow passages within the valve block,
(f) said valve stem having side walls defining a hollow interior and a transverse partition dividing the interior of the valve stem into an upper and lower chamber, wherein a flow passage in said valve block extending between the pump and the valve stem communicates with the upper chamber of the valve stem through an opening in said valve stem,
(g) two hydraulic motors in said fluid reservoir, each being comprised of a motor housing and a reaction member, said motor housings being mounted on said valve block with each having an inlet port in communication with the outlet port of the valve block, said valve block having a second flow passage extending from the valve stem to the hydraulic motors which communicates through said outlet ports with the upper chamber of said valve stem through a second opening to provide a fluid flow passage from the hydraulic pump to the hydraulic motors, and a discharge port to discharge the fluid to the reservoir,
(h) driven shafts operably connected to the reaction member of the hydraulic motors and extending out of the housing.

2. A hydraulic drive axle assembly for use in a vehicle comprising:

(a) an axle frame,
(b) means in said frame for providing a fluid reservoir,
(c) a hydraulic pump mounted in said fluid reservoir having a body portion and a reaction member with a port in said body portion providing communication between the reservoir and the reaction member and a second port in said body portion for discharge of the fluid from the pump,
(d) a means connected to the hydraulic pump for driving the reaction member,
(e) a valve control block attached directly to the hydraulic pump having a series of passageways therein in communication with the discharge port in the body portion of the hydraulic pump and containing a cylindrical through bore in which is mounted a rotatable hollow cylindrical valve stem having a transverse partition dividing said valve stem into an upper and lower chamber and having side walls with openings therein for communication with the passageways in said valve block, said passageways in the valve block comprising a by-pass system, a forward system and a reverse system wherein the valve stem may be rotated within the through bore of the valve block to activate any one of the three systems and so alter the flow of hydraulic fluid as to change the motion of the vehicle,
(f) at least two hydraulic motors mounted in said fluid reservoir, each comprised of a motor housing and a reaction member, said housing having an inlet port and a discharge port in communication with the reaction member and the passageways in the valve control block for the passage of hydraulic fluid to operate the motors, (g) driven shafts connected to the reaction member of the hydraulic motors and extending out from the axle frame.

3. A drive axle assembly for a vehicle having a power plant and traction wheels and providing an operable connection between the power plant and said traction wheels, said drive axle assembly being comprised of:
   (a) an axle housing defining a fluid reservoir,
   (b) at least one hydraulic pump, two hydraulic motors and a control valve block mounted in said reservoir, said hydraulic pump having a body portion and a reaction member with a port in said body portion providing communication between the fluid reservoir and the reaction member of said hydraulic pump, and a second port in said body portion for discharge of the fluid,
   (c) means extending from a power plant into said housing and connected to the hydraulic pump for driving the reaction member,
   (d) the control valve block being attached directly to the hydraulic pump and having passageways therein in communication with the discharge port in the body portion of the hydraulic pump for the flow of hydraulic fluid between the hydraulic pump and the motors, a control valve in said valve block operable to control flow of the hydraulic fluid, from the pump and direction of said fluid to and from the motors and thereby the direction of driving of said motors, said control valve having a stem means connected thereto and extending out of the axle housing for operation thereof,
   (e) said hydraulic motors each being comprised of a motor housing, a reaction member and a driven shaft connected to said reaction member and extending out from the axle housing, the motor housings being on opposed sides of the valve block with each hydraulic motor being attached directly to the valve block and having an inlet port in said housing to provide communication between the passageways of the valve block and the reaction member of said hydraulic motor and a discharge port in communication with the reservoir.

4. A drive axle assembly for a vehicle having a power plant and traction wheels and providing an operable connection between the power plant and said traction wheels, said drive axle assembly being comprised of:
   (a) an axle housing defining a fluid reservoir,
   (b) at least one hydraulic pump, two hydraulic motors and a control valve block mounted in said reservoir, said hydraulic pump having a body portion and a reaction member with a port in said body portion providing communication between the fluid reservoir and the reaction member of said hydraulic pump, and a second port in said body portion for discharge of the fluid,
   (c) means extending from a power plant into said housing and connected to the hydraulic pump for driving the reaction member,
   (d) the control valve block being attached directly to the hydraulic pump and having passageways therein in communication with the discharge port in the body portion of the hydraulic pump for the flow of hydraulic fluid between the hydraulic pump and the motors,
   (e) said hydraulic motors each being comprised of a motor housing, a reaction member, and a driven shaft connected to said reaction member and extending out of the axle housing, the motor housings being opposed sides of the valve block with each hydraulic motor being attached to the valve block and having an inlet port in said housing to provide communication between the passageways of the valve block and the reaction member of said hydraulic motor, and a discharge port in communication with the reservoir,
   (f) said valve block having an opening therein, a control means in said valve block including a rotatable hollow valve stem having side walls disposed in said opening and containing a plurality of openings through its side walls with a partition dividing the valve stem into an upper and lower chamber, a fluid delivery passageway in said valve block extending between the pump and the valve stem, and communicating with the upper chamber of the valve stem through an opening in the side wall of said valve stem, a second passageway in the valve block extending from the valve stem outwardly to each of the hydraulic motors through an opening in said valve stem to provide a continuous fluid passage from the hydraulic pump to the hydraulic motors which passes through the rotatable valve stem, and a return passage extending from each of the hydraulic motors into the lower chamber of the valve stem through an opening in the valve stem side wall and then out of the valve block through a second opening in the lower chamber of the valve stem to provide a passageway from the motors to the reservoir.

5. A drive axle assembly as recited in claim 4 wherein the return passageway from the motor to the fluid reservoir is connected to the upper chamber of the valve stem and the fluid delivery passageway is connected to the lower chamber in the valve stem such that the valve stem may be rotated to align an opening therein to provide an inflow of fluid to the hydraulic motors through the return passage, and an outflow to the reservoir through the delivery passageway, thus reversing the direction of motion of the reaction member of the respective motors resulting in a reverse direction of motion in the vehicle itself.

References Cited

UNITED STATES PATENTS

| 1,136,363 | 4/1915 | Pepper | 60—53 |
| 1,190,139 | 7/1916 | Ford | 60—53 |
| 1,227,055 | 5/1917 | Kellogg | 60—53 |
| 1,316,164 | 9/1919 | Kettler | 60—53 |
| 3,200,593 | 8/1965 | Kuze | 60—53 |
| 3,209,538 | 10/1965 | Kuze | 60—53 |
| 3,279,172 | 10/1966 | Kudo et al. | 60—53 |

EDGAR W. GEOGHEGAN, *Primary Examiner.*